(12) United States Patent
Guenther

(10) Patent No.: US 8,007,271 B2
(45) Date of Patent: Aug. 30, 2011

(54) INJECTION NOZZLE, IN PARTICULAR HOT-RUNNER NOZZLE, FOR ARRANGEMENT IN AN INJECTION MOULD

(75) Inventor: Herbert Guenther, Allendorf/Rennertehausen (DE)

(73) Assignee: Guenther Heisskanal Technik GmbH, Frankenberg (DE)

( * ) Notice: Subject to any disclaimer, the term of this patent is extended or adjusted under 35 U.S.C. 154(b) by 197 days.

(21) Appl. No.: 12/303,556

(22) PCT Filed: May 23, 2007

(86) PCT No.: PCT/EP2007/004547
§ 371 (c)(1),
(2), (4) Date: Dec. 5, 2008

(87) PCT Pub. No.: WO2007/140878
PCT Pub. Date: Dec. 13, 2007

(65) Prior Publication Data
US 2010/0297283 A1     Nov. 25, 2010

(30) Foreign Application Priority Data
Jun. 8, 2006 (DE) .......................... 10 2006 026 580

(51) Int. Cl.
*B29C 45/20* (2006.01)
(52) U.S. Cl. .................... 425/549; 264/328.15
(58) Field of Classification Search ................. 425/549; 264/328.15
See application file for complete search history.

(56) References Cited

U.S. PATENT DOCUMENTS

| | | | | |
|---|---|---|---|---|
| 4,557,685 A | | 12/1985 | Gellert | 425/549 |
| 5,135,377 A | | 8/1992 | Gellert | 425/130 |
| 5,312,241 A | * | 5/1994 | Gunther | 425/549 |
| 5,507,635 A | | 4/1996 | Gellert | 425/190 |
| 6,009,616 A | | 1/2000 | Gellert | 29/611 |
| 6,162,043 A | * | 12/2000 | Gellert | 425/549 |
| 7,462,030 B2 | | 12/2008 | Fischer | |
| 2003/0003188 A1 | | 1/2003 | Guenther | 425/549 |
| 2010/0297283 A1 | | 11/2010 | Guenther | |

FOREIGN PATENT DOCUMENTS

| | | |
|---|---|---|
| JP | 2002525221 A | 8/2002 |
| JP | 2004521778 A | 7/2004 |
| JP | 2005297566 A | 10/2005 |

* cited by examiner

*Primary Examiner* — Tim Heitbrink
(74) *Attorney, Agent, or Firm* — Andrew Wilford

(57) ABSTRACT

In the case of an injection nozzle, in particular hot-runner nozzle (7), for arrangement in an injection mould (11) which has a relatively large number of plates as a function of the configuration, and which has, on its solid mould side (I), at least one platen (4) and one feed plate (5), and, on its moveable, separable mould side (II) at least one cavity plate (2), at the mould cavity (3) of which a nozzle point (8) is used, where the hot-runner nozzle (7) has, at its rear end distant from the nozzle point (8), a hollow flange housing (18) which has a housing collar (11) and which receives a material tube (20) with a flow channel (9) for a material melt leading to the nozzle point (8), and also has connections for a heating system (16) and/or cooling system and temperature sensor (17), the material pipe (20) has been connected at its rear end by way of a delimited length section (21) of its outer jacket area to the flange housing (18) at the inner jacket area thereof so as to form a single piece.

8 Claims, 2 Drawing Sheets

INJECTION NOZZLE, IN PARTICULAR HOT-RUNNER NOZZLE, FOR ARRANGEMENT IN AN INJECTION MOULD

CROSS REFERENCE TO RELATED APPLICATIONS

This application is the US national phase of PCT application PCT/EP2007/004547, filed 23 May 2007, published 13 Dec. 2007 as WO2007/140878A1, and claiming the priority of German patent application 102006026580.7 itself filed 8 Jun. 2006, whose entire disclosures are herewith incorporated by reference.

FIELD OF THE INVENTION

The invention relates to an injection-molding nozzle, in particular a hot-runner nozzle, for use in an injection-molding injector having, depending on configuration, a relatively large number of plates, and having on its fixed side at least one mounting or mold-clamping plate and one distribution plate, and on its mold side at least one mold plate forming a mold cavity into which the nozzle tip opens, the hot-runner nozzle being provided with a housing collar, a concentric material tube being provided with a flow passage for a molten material opening into a nozzle tip, and having connections for a heating element and temperature sensor.

BACKGROUND OF THE INVENTION

Such an injection-molding nozzle is known from DE 195 42 237 [U.S. Pat. No. 5,507,634], which is provided as a hot-runner nozzle having an integrated electric heating element, and having a central borehole as a flow passage for conveying the thermoplastic melt to the nozzle tip and then into the cavity of a cooled mold or a separable mold block having the mold cavity provided in a mold plate. The mold plate may form multiple mold cavities, and the injection mold may be correspondingly provided with multiple injection-molding nozzles.

The hot-runner nozzle comprises an elongated central body seated in a one-piece outer collar or a flange housing provided with a flange part as housing collar. The central body comprises, on its elongated central shaft part on its rear end, another flange or housing collar that is shaped like a clover-leaf and engages positively into the correspondingly contoured housing collar or flange of the outer collar or of the flange housing. The injection nozzle constructed in this manner by insertion into each other is placed with the rear flange or housing collar into a seat in a plate on the hot tool side and screwed down.

Another embodiment of such a hot-runner nozzle known from EP 0 528 315 [U.S. Pat. No. 5,312,241] consists of a rather broad flange body provided with lateral electrical connections that is extended as a narrow shaft through which a material tube heated from the outside extends. This shaft has several parts including an outer casing tube with an upper collar for contacting upon insertion into a mold-cavity plate. The material tube with the flow passage emptying into nozzle tips is designed on its rear end with a shoulder-like outer collar via which the material tube is connected to the flange body or tubular flange housing by welding where it contacts front surfaces lying on each other. A cap placed over the extending shoulder piece of the jacket tube forms the rear closure of this hot-runner nozzle.

In a hot runner-or cold runner nozzle used in injection-molding tools and known from DE 100 04 072 [U.S. Pat. No. 6,805,549], in order to supply a fluent mass at a preset temperature under high pressure to a separable tool block (mold cavity), the nozzle body comprises at least one substantially planar level lateral surface to which an surface heating and/or cooling apparatus is attached.

OBJECT OF THE INVENTION

The object of the invention is to create a generic injection nozzle, especially a hot-runner nozzle, that has a simple construction and makes possible an easy installation into and removal from the molding tool.

SUMMARY OF THE INVENTION

The invention solves this problem in that the jacket tube is connected on its rear end via a limited longitudinal section of its outer surface in one piece to the flange housing on its inner surface. Thus, the material tube and the flange housing no longer need to be inserted into one another or joined to one another but rather there is a solid compact unit during installation and removal.

As a consequence of the connection, in accordance with a preferred embodiment of the invention by pressing the material tube against the hollow-body flange housing, of these structural parts at the site of this action, that is, where the outer surface of the material tube and the inner surface of the throughgoing hole of the flange housing rest concentrically on one another, a very narrow construction can be achieved that requires no rear collar or housing collar, shoulder piece or the like and requires no additional positive engagement or positive seat. The compact nozzle unit requires for insertion and removal merely the loosening of the plug connections for the heating and/or cooling and optional temperature measuring sensors in order to be able to be removed from or fitted to the plates of the injection-molding tool.

The compact construction is furthermore favored by the fact that according to the invention the material tube is of uniform cross-section without offsets from its front end on the nozzle side to its rear end fitted with the flange housing. Thus, the dimensions of the compact nozzle unit with the material tube extending continuously in a uniform manner are determined solely by the outside diameters of the material tube to be maintained conditioned by the requirements and of the flange housing concentrically surrounding the latter, pressing on the rear end. The term without offsets denotes here that for the pressing in of the material tube into the flange housing in the seat area a narrower tolerance is maintained over its length than in the other area of the material tube and a minimal spacing (less than $1/10$ mm) is provided that ensures a defined pressing-in depth of the material tube in the flange housing. This also applies in a comparable manner to the front sealing area of the material tube.

Instead of designing the one-piece housing composite by a force fit by pressing the material tube into the flange housing, the invention suggests as an alternative that these structural parts be soldered together at the limited, determined longitudinal section or welded together, the latter from the flush closing front sides on the circumferential impact joint between the material tube and the flange housing.

An embodiment of the invention provides for the improvement of the temperature management that the flange housing consists of titanium.

BRIEF DESCRIPTION OF THE DRAWING

Other features and details of the invention are seen from the following description of an embodiment of the invention shown in the drawings.

SPECIFIC DESCRIPTION

Figure 1:
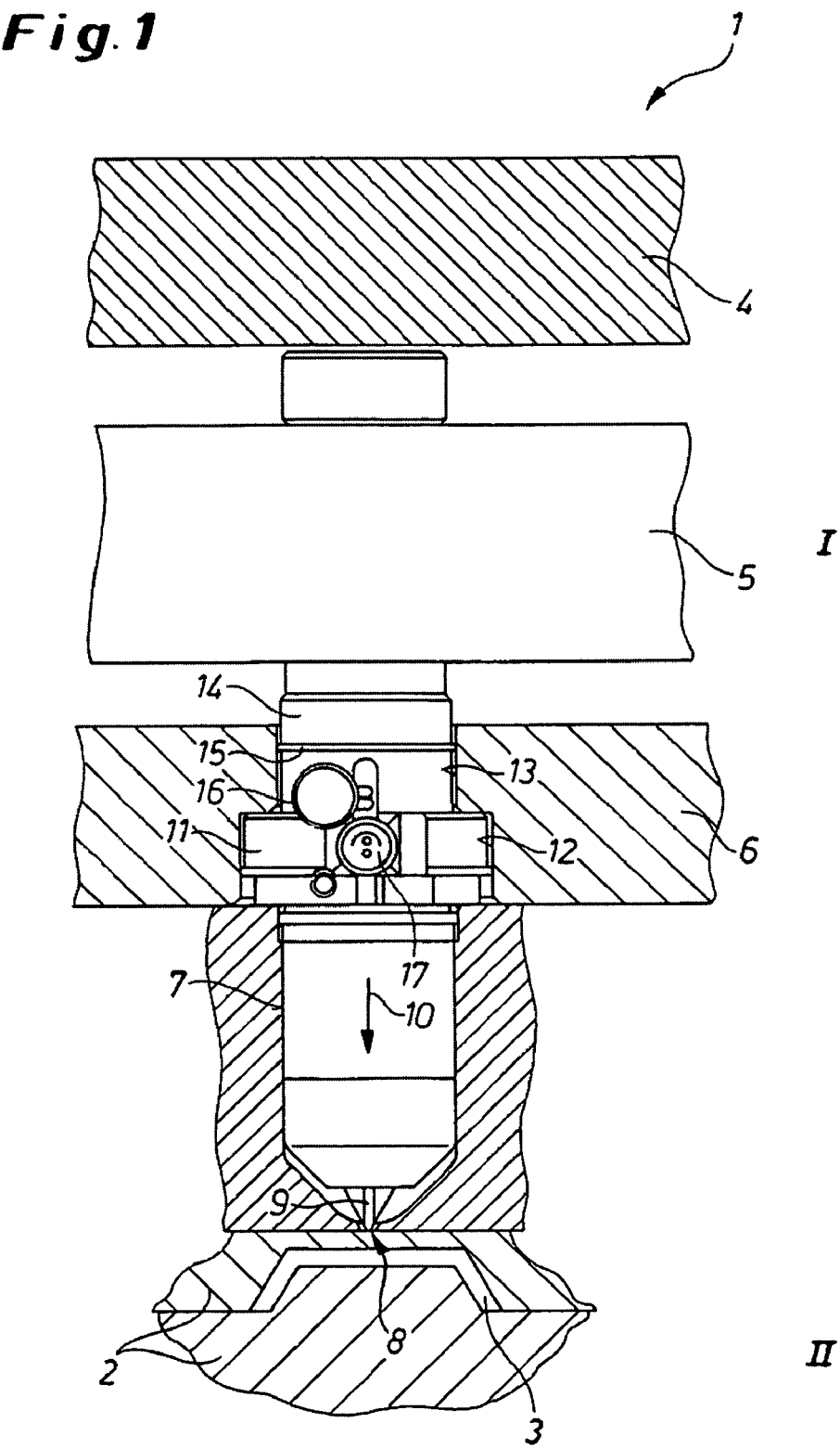
FIG. 1 shows an injection nozzle built into an injection-molding tool in schematic partial cross section.

An injection molder 1 shown in the drawing comprises multiple plates on its fixed back side I, and on its front mold side II has a separable mold block together with a pair of mold parts 2 forming a mold cavity 3 (see FIG. 1). Of these, a mounting plate or mold-clamping plate 4, a distribution plate 5 with unillustrated flow passages, and a frame or intermediate plate 6 are shown on the fixed side I. This has a flow passage 9 in a central shell tube opening into a nozzle tip 8 for the molten metal fed from the distribution plate 5 in an injection molding direction 10 from a nozzle tip 8 into the cavity 3 in the mold plate 2.

The injection or hot-runner nozzle 7 is fitted with a housing collar 11 into a seat 12 of the intermediate plate 6, which seat is open to the front in the injection direction 10. The seat 12 merges with a throughgoing hole 13 through which a rear housing end 14 of the hot-runner nozzle 7 projects rearward for connection to the distributor plate 5. The rear housing end 14 is provided with a seal in the form of a circumferential sealing bead 15 that fit tightly into the throughgoing hole 13 of the seat 12 of the intermediate plate 6. Plug connections with a lateral feed for a heater and a temperature measuring sensor 16 and 17 are provided.

Figure 2:
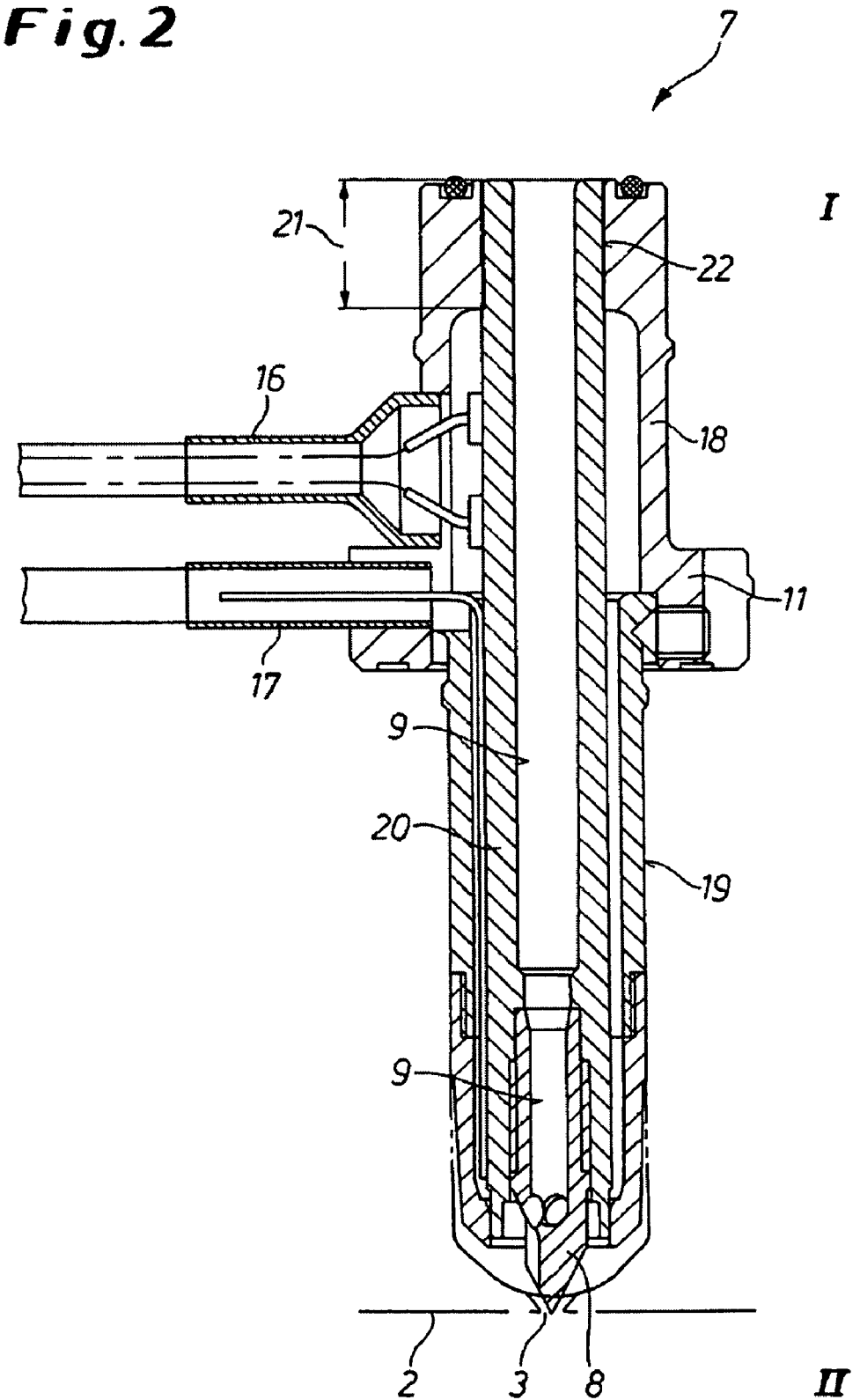
FIG. 2 shows in detail in longitudinal section an injection nozzle designed as a hot-runner nozzle.

The hot-runner nozzle 7 shown in the illustrated embodiment according to FIG. 2 comprises a hollow-body flange housing 18 provided with the housing collar 11 and comprises a shaft 19 that is more slender or smaller in diameter than it, joins it in the front and is screwed to the flange housing 18 in the area of the housing collar 11. The flange housing 18 and the shaft 19 concentrically surround a material tube 20 that is constructed with the flow passage 9 emptying into the nozzle tip 8. Alternatively, a construction without such a shaft 19 is possible, for which the lower end of the material tube 20 itself would sit directly sealed in the tool.

The material tube 20 is constructed continuously without offsets starting from its front end on the nozzle side terminating flush at its front end with the flange housing 18, and is connected in one piece at its rear end via a limited longitudinal section 21 by a force fit 22 to the flange housing 18. This is achieved by pressing the outer surface of the material tube 22 in and pressing with the inner surface of the housing bore of the flange housing 18 resting over limited longitudinal section 21. This creates a small compact unit, and for insertion into or removal from the injection-molding tool merely the plug connections for heating and temperature measuring sensors 16 and 17 need to be loosened or connected. The hot-runner nozzle can therefore be mounted as a single unit in a simple manner.

The invention claimed is:

1. An injection-molding nozzle assembly comprising:
    a front mold plate formed with a rearwardly open mold cavity;
    a distribution plate behind the mold plate and adapted to feed a hot melt to a front face of the distribution plate;
    a mounting plate behind the distribution plate;
    a nozzle having a rear end engaging the distribution plate and a front-end tip fitting with the mold plate and opening into the cavity, the nozzle being formed by
        an outer tubular flange housing extending between the rear end and the tip, and
        an inner material tube extending inside the flange housing between the rear end and the tip and having a front-to-back throughgoing passage and a rear end portion concentrically force fitted inside the outer flange housing at the rear end; and
    an electrical component carried on the nozzle and having an electrical lead-out wire.

2. The nozzle assembly defined in claim 1, further comprising
    an intermediate plate between the mold plate and the distribution plate and formed with a throughgoing hole with a large-diameter front portion forming a seat fitted to the flange housing and a small-diameter rear portion through which the rear end of the nozzle extends, the portions forming a shoulder against which a flange of the nozzle bears rearwardly.

3. The nozzle assembly defined in claim 2 wherein the front portion is cylindrical and centered on an axis.

4. The nozzle assembly defined in claim 3 wherein the flange housing is formed with a seal lip that extends radially in a plane perpendicular to the axis from the nozzle and that bears outwardly on an inner surface of the hole.

5. The nozzle assembly defined in claim 1 wherein the component is a temperature sensor or heater.

6. An injection-molding nozzle assembly comprising:
    a front mold plate formed with a rearwardly open mold cavity;
    a distribution plate behind the mold plate and adapted to feed a hot melt to a front face of the distribution plate;
    a mounting plate behind the distribution plate;
    a nozzle having a rear end engaging the distribution plate and a front-end tip fitting with the mold plate and opening into the cavity, the nozzle being formed by
        an outer tubular flange housing extending between the rear end and the tip, and
        an inner material tube extending inside the flange housing between the rear end and forming the tip and having a front-to-back throughgoing passage and a rear end portion concentrically force fitted inside the outer flange housing at the rear end, the material tube being of generally uniform cross section rearward of the tip to the rear end; and
    an electrical component carried on the nozzle and having an electrical lead-out wire.

7. The nozzle assembly defined in claim 1 wherein the flange housing is formed of titanium.

8. The nozzle assembly defined in claim 1 wherein the flange housing has at the rear end a cylindrical inner surface and the material tube has at the rear end a cylindrical outer surface engaging the inner surface in annular surface contact.

* * * * *